United States Patent [19]

Sugawara et al.

[11] Patent Number: 6,071,623
[45] Date of Patent: Jun. 6, 2000

[54] HYDROPHILIC ARTICLE AND METHOD FOR PRODUCING SAME

[75] Inventors: Satoko Sugawara, Kanagawa; Yasuaki Kai, Yokohama; Seiji Yamazaki, Mie, all of Japan

[73] Assignees: Central Glass Company, Limited, Yamaguchi; Nissan Motor Co., Ltd., Kanagawa, both of Japan

[21] Appl. No.: 09/115,740

[22] Filed: Jul. 15, 1998

[30] Foreign Application Priority Data

Feb. 13, 1998 [JP] Japan ................................. 10-031093

[51] Int. Cl.[7] .................................................... B32B 17/00
[52] U.S. Cl. ......................... 428/428; 428/325; 428/432; 428/701; 428/702; 427/163.1; 427/165; 427/168; 427/169; 427/372.2; 427/397.7; 65/60.52
[58] Field of Search .................................. 428/428, 432, 428/701, 702, 325; 427/163.1, 165, 168, 169, 372.2, 397.7; 65/60.52

[56] References Cited

U.S. PATENT DOCUMENTS

| | | |
|---|---|---|
| 4,568,578 | 2/1986 | Arfsten et al. . |
| 5,413,865 | 5/1995 | Nakamura . |
| 5,895,722 | 4/1999 | Kobayashi . |

FOREIGN PATENT DOCUMENTS

| | | |
|---|---|---|
| 748 775 A2 | 12/1996 | European Pat. Off. . |
| 4-182327 | 6/1992 | Japan . |
| 5-253544 | 10/1993 | Japan . |
| 7-232080 | 9/1995 | Japan . |
| 7-315880 | 12/1995 | Japan . |
| 8-190088 | 7/1996 | Japan . |
| 9-59042 | 3/1997 | Japan . |
| 2 316 687 | 3/1998 | United Kingdom . |

*Primary Examiner*—Timothy M. Speer
*Attorney, Agent, or Firm*—Evenson, McKeown, Edwards & Lenahan, P.L.L.C.

[57] ABSTRACT

The invention relates to a hydrophilic article having (a) a substrate; (b) a first layer formed on the substrate; and (c) a second layer formed on the first substrate. The first layer contains (1) an amorphous silica and (2) at least one first amorphous metal oxide selected from titania and alumina. The second layer has (1) a matrix phase constituted of a crystalline titania and at least one second amorphous metal oxide and (2) a dispersed phase constituted of ultrafine particles made of at least one material selected from silica and alumina. The hydrophilic article is excellent in durability, since the second layer is superior in adhesion to the first layer. The hydrophilic article can be produced by a method including steps of (a) providing a first solution containing a precursor of the amorphous silica and a precursor of the at least one first amorphous metal oxide; (b) applying the first solution to the substrate, thereby to form a first precursory layer; (c) providing a second solution containing a precursor of the crystalline titania, the ultrafine particles, and a precursor of the at least one second amorphous metal oxide; (d) applying the second solution to the first precursory layer, thereby to form a second precursory layer; and (e) baking the first and second precursory layers into the first and second layers.

16 Claims, No Drawings

HYDROPHILIC ARTICLE AND METHOD FOR PRODUCING SAME

The contents of Japanese Patent Application No. 10-031093 having a filing date of Feb. 13, 1998 are hereby incorporated by reference.

BACKGROUND OF THE INVENTION

The present invention relates to a hydrophilic article having an outermost hydrophilic film, for uses in various fields such as of architectural and automotive window panes and mirrors.

In recent years, there have been proposals to form photocatalytic films on various substrates for providing stain resistance, deodorizing property, antibacterial property, hydrophilicity, and the like. For example, Japanese Patent First Publication JP-A-5-253544 discloses a method for producing a platelike member having a function of deodorization. In this method, a glaze (binder) layer is formed on a tile substrate. Then, a fine powder of anatase-type $TiO_2$ in the form of sol is applied to the glaze layer. Then, the glaze layer is melted by heating and then solidified by cooling. With this, part of the $TiO_2$ fine powder is exposed on the glaze layer. JP-A-7-232080 discloses a multifunctional material having a substrate, a binder layer formed thereon, and a photocatalytic layer made up of photocatalytic particles and filler particles for binding together the photocatalytic particles. It is disclosed therein that the photocatalytic particles may be made of $TiO_2$, $ZnO$, $SrTiO_3$, $Fe_2O_3$, $CdS$, $CdSe$, $WO_3$, $FeTiO_3$, $GaP$, $GaAs$, $RuO_2$, $MoS_3$, $LaRhO_3$, $CdFeO_3$, $Bi_2O_3$, $MoS_2$, $In_2O_3$, $CdO$, and $SnO_2$. It is further disclosed that the filler particles are preferably made of metals such as Sn, Ti, Ag, Cu, Zn, Fe, Pt, Co, Pd and Ni and oxides of these metals. JP-A-9-59042 discloses a transparent substrate having an antifogging coating thereon. This coating is made of a mixture of a medium having a refractive index of less than 2 and titania particles having an average crystal particle diameter of not larger than about 0.1 $\mu$m. It is known, when a photocatalytic titania film is directly formed on a $Na^+$-containing glass (e.g., soda-lime glass) substrate, sodium ions and alkali metal oxides may diffuse from the glass substrate into the photocatalytic film. With this, the photocatalytic activity of titania may be damaged. In view of this, there have been several proposals for forming a metal oxide interlayer under a functional film in order to prevent migration of sodium ions from a substrate (e.g., soda-lime glass) into the functional film. For example, JP-A-4-182327 discloses a functional glass plate having a $Na^+$-containing glass substrate; an ultraviolet-absorbing functional film containing ZnO and having a thickness of at least 0.5 $\mu$m; and an undercoat layer (interlayer) interposed between the glass substrate and the functional film. This undercoat layer is made of a metal oxide such as $SiO_2$, $SiO_2$-$TiO_2$ or $SiO_2$-$ZrO_2$. JP-A-7-315880 discloses a glass plate intended to be used as a touch panel that is superior in visibility. This glass plate has a transparent glass substrate, a first $SiO_2$ film formed on the substrate, a second $TiO_2$ film formed on the first film, and a third $SnO_2$ transparent conductive film formed on the second film. The third film has a resistance of 0.5–1.5 K $\Omega$/□. JP-A-8-190088 discloses a coated glass article having (a) a transparent glass substrate containing alkali metal ions; (b) a barrier layer formed on the glass substrate, for preventing diffusion of the alkali metal ions; and (c) a metal-containing coating formed on the barrier layer. The barrier layer has a thickness of not greater than 120 Å and is made of a metal oxide selected from zirconium oxide and titanium oxide. The metal-containing coating is made of a conductive metal oxide selected from indium oxide, tin oxide, indium/tin oxide, and zinc/aluminum oxide.

SUMMARY OF THE INVENTION

It was found that, when a $SiO_2$ film is used as an interlayer for preventing diffusion of sodium ions from a substrate into a photocatalytic film, the photocatalytic film may become inferior in adhesion to the interlayer. With this, the photocatalytic film may exfoliate from the interlayer, for example, in a severe environment.

It is therefore an object of the present invention to provide a hydrophilic article that is superior in durability.

It is a more specific object of the present invention to provide a hydrophilic article having a photocatalytic film that is superior in adhesion to an interlayer thereof.

It is another object of the present invention to provide a method for producing such hydrophilic article.

According to the present invention, there is provided a hydrophilic article comprising (a) a substrate; (b) a first layer (interlayer) formed on the substrate and comprising (1) an amorphous silica and (2) at least one first amorphous metal oxide selected from the group consisting of titania and alumina; and (c) a second layer formed on the first layer and comprising (1) a matrix phase constituted of a crystalline titania and at least one second amorphous metal oxide and (2) a dispersed phase constituted of ultrafine particles made of at least one material selected from the group consisting of silica and alumina. As mentioned above, the first layer comprises (1) an amorphous silica and an amorphous titania, or (2) an amorphous silica and an amorphous alumina, or (3) an amorphous silica, an amorphous titania and an amorphous alumina. With this, the inventors unexpectedly found that it becomes possible to prevent dissolution of the first layer's silica and to remarkably improve the strength of chemical bond between the first layer (interlayer) and the second photocatalytic layer in durability tests with respect to water resistance, salt water resistance, humidity resistance, and the like. We further unexpectedly found that it becomes possible to prevent migration of alkali components (e.g. sodium ions) from the substrate to the second photocatalytic layer. In other words, the first layer contributes to the alkali passivation. We still further unexpectedly found that durability of the photocatalytic activity of the second layer is sufficiently long. In fact, the crystalline titania of the second layer has a photocatalytic activity. This crystalline titania is excited by irradiation with ultraviolet rays. With this, it becomes to have a photocatalytic activity and thus makes the second layer's surface hydrophilic. The crystalline titania of the second layer is preferably an anatase-type titania, but may be a rutile-type titania. It is assumed that void spaces of the titania crystal boundaries of the second layer are occupied by or filled with the at least one second amorphous metal oxide. In other words, the at least one second amorphous metal oxide serves as a binder for binding together the titania crystals of the second layer. Thus, as mentioned above, the crystalline titania and the at least one second amorphous metal oxide constitute the matrix phase of the second layer. It is further assumed that the ultrafine particles, which constitute the dispersed phase of the second layer, make the second layer microporous and thus make the surface area of the second layer tremendously large. Furthermore, the ultrafine particles are assumed to be capable of having a large number of hydroxyl groups at the surface thereof. Thus, the second layer becomes high in photocatalytic activity. With this, the hydrophilic article is maintained in hydrophilicity even under a condition of a weak ultraviolet irradiation such as night or rainy condition.

According to the present invention, there is provided a method for producing the above-mentioned hydrophilic article. This method comprises the steps of (a) providing a first solution (sol) comprising a precursor of the amorphous silica and a precursor of the at least one first amorphous metal oxide; (b) applying the first solution to the substrate, thereby to form a first precursory layer; (c) providing a second solution (sol) comprising a precursor of the titania, the ultrafine particles and a precursor of the at least one second amorphous metal oxide; (d) applying the second solution to the precursory first layer, thereby to form a second precursory layer; and (e) baking the precursor first and second layers into the first and second layers.

DESCRIPTION OF THE PREFERRED EMBODIMENTS

A hydrophilic article according to the present invention will be described in detail as follows. The material for preparing the substrate of the hydrophilic article is not particularly limited. It may be one of inorganic and organic materials, such as glass, metal and resin. Of these, glass is particularly preferable due to its superior transparency and durability. The shape of the substrate is not particularly limited either, and it may be a platelike shape. In fact, a conventional soda-lime glass plate is preferably used as the substrate. Furthermore, the substrate may be selected from conventional float glass plates, which are generally used for automotive and architectural window panes and mirrors. The substrate may be colorless or may have one of various colors, such as green and bronze. It may have one or various additional functions such as heat reflection. It may be a tempered glass, a laminated glass, or a multiple glass. It may be flat or curved in shape. For example, it may have a thickness of from about 1.0 to about 12 mm. It is preferable to have a thickness of from about 2.0 to about 10 mm in architectural use. Furthermore, it is preferable to have a thickness of from about 1.5 to about 6.0 mm, more preferably from about 2.0 to about 5.0 mm, in automotive use. It is preferable to have a thickness of from about 1.0 to about 3.0 mm in use as a mirror.

In the invention, the method for producing the hydrophilic article comprises the step (a) providing a first solution comprising a precursor of the amorphous silica and a precursor of the at least one first amorphous metal oxide selected from titania and alumina. The precursor of the amorphous silica may be selected from silicon nitrates, organosilicates, silicon acetylacetonates and silicon alkoxides. Examples of the silicon alkoxides are tetraethoxysilane, tetramethoxysilane, monomethyltriethoxysilane, monomethyltrimethoxysilane, dimethyldimethoxysilane, dimethyldiethoxysilane, other tetraalkoxysilanes, and other alkylalkoxysilanes. Similarly, the precursor of the amorphous titania used as the at least one first amorphous metal oxide may be selected from titanium nitrates, titanium salts prepared by combining titanium hydroxides and organic acids, titanium acetylacetonates, and titanium alkoxides Examples of the titanium alkoxides are titanium tetraisopropoxide and titanium tetra-n-butoxide. An example of the titanium acetylacetonates is titanium triisopropoxy monoacetylacetonate. Similarly, the precursor of the amorphous alumina used as the at least one first amorphous metal oxide may be selected from aluminum nitrates, aluminum salts prepared by combining aluminum hydroxides and organic acids, aluminum acetylacetonates, and aluminum alkoxides. An example of the aluminum alkoxides is aluminum butoxide. The method for producing the hydrophilic article comprises the step (b) applying the first solution to the substrate, thereby to form a first precursory layer. When the first precursory layer is baked in the step (e), it is assumed that titania precursor reacts with alkali ions (e.g., sodium ions) of the substrate. Thus, the titania of the first layer becomes amorphous. Each precursor contained in the first solution may be amorphous particles having a submicron (less than 1 µm) particle diameter, thereby to make the first layer transparent.

In the invention, the method for producing the hydrophilic article comprises the step (c) providing a second solution comprising a precursor of a crystalline titania, ultrafine particles made of at least one material selected from silica and alumina, and a precursor of at least one second amorphous metal oxide. As stated above, the second solution is used for forming the second layer on the first layer. The precursor of the crystalline titania of the second layer may be selected from the above-mentioned exemplary titanium compounds of the precursor of the amorphous titania of the first layer. The method for producing the hydrophilic article comprises the step (d) applying the second solution to the first precursory layer, thereby to form thereon a second precursory layer. When the second precursory layer is baked into the second layer in the step (e), the titania of the second layer becomes crystalline by heat, while the alkali ion's migration from the substrate to the second layer is prevented by the provision of the first layer therebetween. The titania precursor contained in the second solution may be amorphous or crystalline particles having a submicron (less than 1 µm) particle diameter, thereby to make the second layer transparent.

In the invention, the at least one second amorphous metal oxide of the second layer is not particularly limited, so long as it serves as a binder for binding together the titania crystals in the second layer. The at least one second amorphous metal oxide is preferably selected from silica, alumina and zirconia, which make the second layer superior in water resistance. Precursors of these silica and alumina may be selected from the above-mentioned examples of the precursors of the amorphous silica and alumina of the first layer. A precursor of the amorphous zirconia may be selected from zirconium alkoxides (e.g., zirconium butoxide) and zirconium acetylacetonates. The precursor of the at least one second amorphous metal oxide may be amorphous particles having a submicron particle diameter, thereby to make the second layer transparent.

In the invention, it is preferable to use an alcohol as a solvent for preparing the first and second solutions. Examples of the solvent are alcohols such as methanol, ethanol, propanol, butanol, ethylene glycol and hexylene glycol; esters such as ethyl acetate, butyl acetate and amyl acetate; cellosolves (monoethers of ethylene glycol) such as methyl cellosolve, ethyl cellosolve and butyl cellosolve; and mixtures thereof. A suitable solvent may be selected from the above examples, in view of the evaporation rate of the solvent and the viscosity of the first and second precursory layers. In the invention, it is optional to add a thickener to the first and/or second solution. Examples of the thickener are a polyethylene glycol having an average molecular weight of 200, a polypropylene glycol having an average molecular weight of 400, hydroxypropyl cellulose, and polyvinyl pyrrolidone. It is further optional to add a levelling agent to the first and/or second solution. Examples of the levelling agent are methyl silicones (e.g., dimethyl silicone) and fluorine-containing ones.

In the invention, the silica ultrafine particles of the second layer may be made of crystalline silica, amorphous silica, or colloidal silica, and the alumina ultrafine particles may be made of α-alumina, β-alumina, or γ-alumina. The ultrafine particles are not particularly limited in particle diameter, and their particle diameter may be not greater than about 1 μm. The ultrafine particles of silica and/or alumina may be prepared by supplying silicon chloride and/or aluminum chloride into flames of a mixture of oxygen and hydrogen. It is particularly preferable to disperse the ultrafine particles in a solution, in order to improve dispersibility and stability of the ultrafine particles.

In the invention, it is preferable that the first layer contains 45–92 wt % of the amorphous silica and 8–55 wt % of the at least one first amorphous metal oxide, based on the total weight of the amorphous silica and the at least one first amorphous metal oxide. If the amount of the amorphous silica is less than 45 wt %, the hydrophilic article may become insufficient in acid resistance. If it is greater than 92 wt %, the bond strength between the first and second layers may become poor. With this, the hydrophilic article may become insufficient in water resistance. If the amount of the at least one first amorphous metal oxide is less than 8 wt %, the bond strength between the first and second layers may become poor. If it is greater than 55 wt %, the prevention of sodium ion's migration from the substrate into the second layer may become insufficient in case that the substrate is made of a soda-lime glass. With this, the photocatalytic activity of the crystalline titania of the second layer may substantially be reduced.

In the invention, it is preferable that the second layer contains 40–92 wt % of the crystalline titania, 3–30 wt % of the ultrafine particles, and 5–30 wt % of the at least one second amorphous metal oxide, based on the total weight of the titania, the ultrafine particles and the at least one second amorphous metal oxide. If the amount of the ultrafine particles is less than 3 wt %, the second layer may not become sufficiently large in microporosity and surface area. If it is greater than 30 wt %, the second layer may become insufficient in strength and thus in durability. If the amount of the crystalline titania is less than 40 wt %, the photocatalytic activity of the hydrophilic article may become insufficient. If it is greater than 92 wt %, the hydrophilic article may become insufficient in durability of hydrophilicity, in spite of being sufficient in photocatalytic activity. If the amount of the at least one second amorphous metal oxide is less than 5 wt %, its binding function for binding together the anatase-type titania crystals may become insufficient. With this, the hydrophilic article may become inferior in abrasion resistance. If it is greater than 30 wt %, the anatase-type titania may become poor in crystallinity. With this, the photocatalytic activity of the hydrophilic article may become insufficient.

In the invention, the thickness of the first layer is preferably from about 50 to about 200 nm, more preferably from about 70 to about 130 nm. If it is less than 50 nm, the prevention of alkali ion's migration from the substrate into the second layer may become insufficient in case that the substrate contains alkali ions (e.g., sodium ions). With this, the photocatalytic activity of the second layer may become poor. If it is greater than 200 nm, that is not favorable from the economical viewpoint and may cause cracks on the first layer. The thickness of the second layer is also preferably from about 50 to about 200 nm. If it is less than 50 nm, the photocatalytic activity of the second layer may become insufficient. If it is greater than 200 nm, the photocatalytic activity of the second layer does not improve further as compared with a case that it is in a range of 50–200 nm. Furthermore, the second layer may become poor in strength.

In the invention, the manner of applying the first and second solutions to the substrate and the first layer respectively is not particularly limited. It may be spin coating, dip coating, reverse roller coating, flexograpy, roller coating, coating with nozzle, spraying, or screen printing. It is preferable that each of the first and second solutions has a solid matter concentration of from about 1 to about 30 wt % and a viscosity of from about 1 to about 100 centipoises.

In the method for producing the hydrophilic article, it is preferable to dry the first precursory layer between the steps (b) and (d) and the second precursory layer between the steps (d) and (e) at a temperature of from room temperature to about 300° C., more preferably from about 100 to about 250° C., for about 0.5 to about 60 minutes, more preferably from about 1 to about 30 minutes. The first and second precursory layers, preferably after the drying thereof, are baked in the step (e) preferably at a temperature of about 380–750° C. for about 1–30 min. The thermal tempering and/or the thermal bending of the hydrophilic article is preferably conducted, more preferably at a temperature of about 380–750° C. for about 0.5–10 min, while the step (e) is conducted.

The following nonlimitative examples are illustrative of the present invention.

EXAMPLE 1

The first solution (sol) for forming the first layer on the substrate was prepared as follows. At first, there was prepared a first preliminary solution containing 90 wt % of tetraethoxysilane (a precursor of the amorphous silica) and 10 wt % of titanium isopropoxide (a precursor of the at least one first amorphous metal oxide), based on the total of these on an oxide basis. Then, the first solution was prepared by adding water for hydrolysis of the tetraethoxysilane and the titanium isopropoxide, nitric acid as a catalyst, and ethanol as a solvent, to the first preliminary solution, and then by stirring of the mixture. The obtained first solution had a solid matter concentration of 2 wt % on an oxide basis.

The second solution (sol) for forming the second layer on the first layer was prepared as follows. At first, a second preliminary solution was prepared by mixing together a silica precursor sol containing titanium tetraisopropoxide (precursor of the crystalline titania), ATRON Nti-500 (trade name) of Nippon Soda Co., Ltd., and a dispersion containing colloidal silica (the ultrafine particles) dispersed in isopropyl alcohol, IPA-ST-S (trade name) of Nissan Chemical Industries, Ltd., and a tetraethoxysilane (precursor of the at least one second amorphous metal oxide) sol, COLCOAT 6P of Nippon Col Coat Co. This second preliminary solution contained, on an oxide basis, 90 wt % of the titanium tetraisopropoxide, 5 wt % of the colloidal silica, and 5 wt % of the tetraethoxysilane, based on the total weight of these. Then, a denaturated alcohol (a mixture of 10 wt % of isopropyl alcohol and 90 wt % of ethyl alcohol) was added to the second preliminary solution, and then stirring was conducted, thereby to prepare the second solution having a solid matter concentration of 2 wt % on an oxide basis.

The obtained first solution was applied to a soda-lime glass substrate having widths of 10 cm and a thickness of 2 mm by spin coating, thereby to form thereon a first precursory layer. Then, the coated glass substrate was dried at 250° C. for 5 min and then cooled down to room temperature. Then, the second solution was applied to the first precursory layer by spin coating. Then, the coated glass substrate was again dried at 250° C. for 5 min, then subjected to a preliminary baking at 500° C. for 5 min, and then subjected to a baking at 680° C. for about 7–8 min, thereby to produce a hydrophilic article having first and second layers, each having a thickness of 100 nm, formed on the glass substrate.

EXAMPLE 2

In this example, Example 1 was repeated except in that titanium isopropoxide was replaced with aluminum nitrate nonahydrate in the preparation of the first solution. The obtained first solution had a solid matter concentration of 2 wt % on an oxide basis.

EXAMPLE 3

In this example, Example 1 was repeated except in that 10 wt % of titanium isopropoxide was replaced with a combination of 5 wt % of titanium isopropoxide and 5 wt % of aluminum nitrate nonahydrate in the preparation of the first solution. The obtained first solution had a solid matter concentration of 2 wt % on an oxide basis.

EXAMPLE 4

In this example, Example 1 was repeated except in that the amounts of tetraethoxysilane and titanium isopropoxide were respectively changed to 70 wt % and 30 wt % in the preparation of the first solution.

EXAMPLE 5

In this example, Example 3 was repeated except in that the amounts of tetraethoxysilane, titanium isopropoxide and aluminum nitrate nonahydrate were respectively changed to 70 wt %, 15 wt % and 15 wt % in the preparation of the first solution.

EXAMPLE 6

In this example, Example 1 was repeated except in that the amounts of tetraethoxysilane and titanium isopropoxide were respectively changed to 50 wt % and 50 wt % in the preparation of the first solution.

EXAMPLE 7

In this example, Example 3 was repeated except in that the amounts of tetraethoxysilane, titanium isopropoxide and aluminum nitrate nonahydrate were respectively changed to 50 wt %, 25 wt % and 25 wt % in the preparation of the first solution.

EXAMPLE 8

In this example, Example 1 was repeated except in that the amounts of the titanium tetraisopropoxide, the colloidal silica and the tetraethoxysilane were respectively changed to 80 wt %, 10 wt % and 10 wt % in the preparation of the second solution.

EXAMPLE 9

In this example, Example 1 was repeated except in that the amounts of the titanium tetraisopropoxide, the colloidal silica and the tetraethoxysilane were respectively changed to 75 wt %, 15 wt % and 10 wt % in the preparation of the second solution.

EXAMPLE 10

In this example, Example 1 was repeated except in that the amounts of the titanium tetraisopropoxide, the colloidal silica and the tetraethoxysilane were respectively changed to 50 wt %, 25 wt % and 25 wt % in the preparation of the second solution.

EXAMPLE 11

In this example, Example 9 was repeated except in that 10 wt % of the tetraethoxysilane was replaced with a combination of 5 wt % of the tetraethoxysilane and 5 wt % of aluminum nitrate nonahydrate in the preparation of the second solution.

COMPARATIVE EXAMPLE 1

In this comparative example, Example 1 was repeated except in that the titanium isopropoxide was omitted in the preparation of the first solution.

COMPARATIVE EXAMPLE 2

In this comparative example, Example 1 was repeated except in that the titanium isopropoxide was omitted in the preparation of the first solution and that the colloidal silica and the tetraethoxysilane were omitted in the preparation of the second solution.

EVALUATION TESTS

A photocatalytic activity test was conducted by applying an acetone solution containing 1 wt % of oleic acid to the surface of the second layer of each hydrophilic article, thereby to form a uniform oleic acid film on the second layer. Then, the coated hydrophilic article was irradiated for 2 hrs with ultraviolet rays having an intensity of 0.5 mW/cm$^2$ and a wavelength of 365 nm, using a light source, BLACK LIGHT F15T8BLB (trade name) of Sankyo Denki Co. Then, the photocatalytic activity of the hydrophilic article was evaluated by the difference of the contact angle of water drop disposed on the coated hydrophilic article before and after the irradiation. The results are shown in Table.

TABLE

| | Contact Angles (°) | |
|---|---|---|
| | Before Ultraviolet Irradiation | After Ultraviolet Irradiation |
| Example 1 | 60 | 5 |
| Example 2 | 57 | 2 |
| Example 3 | 58 | 4 |
| Example 4 | 63 | 5 |
| Example 5 | 61 | 4 |
| Example 6 | 58 | 3 |
| Example 7 | 55 | 3 |
| Example 8 | 62 | 2 |
| Example 9 | 67 | 5 |
| Example 10 | 55 | 4 |
| Example 11 | 59 | 4 |
| Com. Ex. 1 | 63 | 9 |
| Com. Ex. 2 | 65 | 14 |

A water resistance test was conducted by immersing the hydrophilic article in a hot water of 60° C. for ten days. At intervals of certain periods of time during the test, a gauze cloth was strongly rubbed against the second layer of the hydrophilic article in the hot water. Then, the external appearance of the hydrophilic article was observed. With this, it was found that the hydrophilic articles according to Examples 1–11 did not change in external appearance even after ten days of the test. In contrast, it was found that those according to Comparative Examples 1–2 had exfoliation of the second layer from the first layer after lapses of two days and five days of the test, respectively.

A humidity resistance test was conducted by allowing the hydrophilic article to stand still for 30 days in an atmosphere of 50° C. and a relative humidity of 98%. At intervals of certain periods of time during the test, a gauze cloth was rubbed thereagainst in the same manner as in the water resistance test. With this, it was found that the hydrophilic articles according to Examples 1–11 and Comparative Example 1 did not change in external appearance even after 30 days of the test. In contrast, it was found that the hydrophilic article according to Comparative Example 2 had exfoliation of the second layer from the first layer after a lapse of 15 days.

An acid resistance test was conducted by immersing the hydrophilic article in 0.1% hydrochloric acid aqueous solution for 48 hr under room temperature. Then, a gauze cloth was rubbed thereagainst in the same manner as in the water resistance test. With this, it was found that all the hydrophilic articles according to Examples 1–11 and Comparative Examples 1–2 did not have any visible change in external appearance.

An alkali resistance test was conducted by immersing the hydrophilic article in 20% sodium carbonate aqueous solution for 48 hr under room temperature. Then, a gauze cloth was rubbed thereagainst in the same manner as in the water resistance test. With this, it was found that all the hydrophilic articles according to Examples 1–11 and Comparative Examples 1–2 did not have any visible changes in external appearance.

A salt water resistance test was conducted by immersing the hydrophilic article in 3% salt water of 60° C. for 48 hr. At intervals of certain periods of time during the test, a gauze cloth was rubbed thereagainst in the same manner as in the water resistance test. With this, it was found that all the hydrophilic articles according to Examples 1–11 did not have any visible changes in external appearance even after a lapse of 48 hr. In contrast, it was found that the hydrophilic article according to Comparative Example 1 had an exfoliation of the second layer from the first layer after a lapse of 36 hr, and that the hydrophilic article according to Comparative Example 2 had that after a lapse of 20 hr.

What is claimed is:

1. A hydrophilic article comprising:
   (a) a substrate;
   (b) a first layer formed on said substrate, said first layer comprising (1) an amorphous silica and (2) at least one first amorphous metal oxide selected from the group consisting of titania and alumina; and
   (c) a second layer formed on said first layer, said second layer comprising (1) a matrix phase constituted of a crystalline titania and at least one second amorphous metal oxide and (2) a dispersed phase constituted of ultrafine particles made of at least one material selected from the group consisting of silica and alumina.

2. A hydrophilic article according to claim 1, wherein said first layer contains 45–92 wt % of said amorphous silica and 8–55 wt % of said at least one first amorphous metal oxide, based on a total weight of said amorphous silica and said at least one first amorphous metal oxide.

3. A hydrophilic article according to claim 1, wherein said second layer contains 40–92 wt % of said crystalline titania, 3–30 wt % of said ultrafine particles, and 5–30 wt % of said at least one second amorphous metal oxide, based on a total weight of said titania, said ultrafine particles and said at least one second amorphous metal oxide.

4. A hydrophilic article according to claim 1, wherein said at least one second amorphous metal oxide is selected from the group consisting of silica, alumina and zirconia.

5. A hydrophilic article according to claim 1, wherein each of said first and second layers has a thickness of from about 50 to about 200 nm.

6. A hydrophilic article according to claim 1, wherein said substrate comprises an alkali component.

7. A hydrophilic article according to claim 6, wherein said substrate is made of a soda-lime glass containing sodium as said alkali component.

8. A hydrophilic article according to claim 1, wherein said crystalline titania of said second layer is an anatase-type titania.

9. A hydrophilic article according to claim 1, wherein said ultrafine particles have a particle diameter of not greater than about 1 $\mu$m.

10. A hydrophilic article according to claim 1, wherein said ultrafine particles are made of colloidal silica.

11. A method for producing a hydrophilic article, said hydrophilic article comprising (a) a substrate; (b) a first layer formed on said substrate, said first layer comprising (1) an amorphous silica and (2) at least one first amorphous metal oxide selected from the group consisting of titania and alumina; and (c) a second layer formed on said first layer, said second layer comprising (1) a matrix phase constituted of a crystalline titania and at least one second amorphous metal oxide and (2) a dispersed phase constituted of ultrafine particles made of at least one material selected from the group consisting of silica and alumina, said method comprising steps of:
   (a) providing a first solution comprising a precursor of said amorphous silica and a precursor of said at least one first amorphous metal oxide;
   (b) applying said first solution to said substrate, thereby to form a first precursory layer;
   (c) providing a second solution comprising a precursor of said crystalline titania, said ultrafine particles, and a precursor of said at least one second amorphous metal oxide;
   (d) applying said second solution to said first precursory layer, thereby to form a second precursory layer; and
   (e) baking said first and second precursory layers into said first and second layers.

12. A method according to claim 11, wherein said precursor of said amorphous silica is selected from the group consisting of silicon nitrates, organosilicates, silicon acetylacetonates and silicon alkoxides, and wherein said precursor of said at least one first amorphous metal oxide is selected from the group consisting of titanium nitrates, aluminum nitrates, titanium salts prepared by combining titanium hydroxides and organic acids, aluminum salts prepared by combining aluminum hydroxides and organic acids, titanium acetylacetonates, aluminum acetylacetonates, titanium alkoxides, and aluminum alkoxides.

13. A method according to claim 11, wherein the step (e) is conducted at a temperature of from 380 to 750° C.

14. A method according to claim 11, wherein said substrate comprises an alkali component.

15. A method according to claim 14, wherein said substrate is made of a soda-lime glass containing sodium as said alkali component.

16. A method according to claim 11, wherein, prior to the step (d), said first precursory layer is dried at a temperature of from room temperature to about 300° C., and wherein, prior to the step (e), said second precursory layer is dried at a temperature of from room temperature to about 300° C.

* * * * *